Aug. 26, 1924.
H. W. BREWER
1,506,158
INDICATOR FOR CENTERING TIRES
Filed Dec. 3, 1923       2 Sheets-Sheet 1
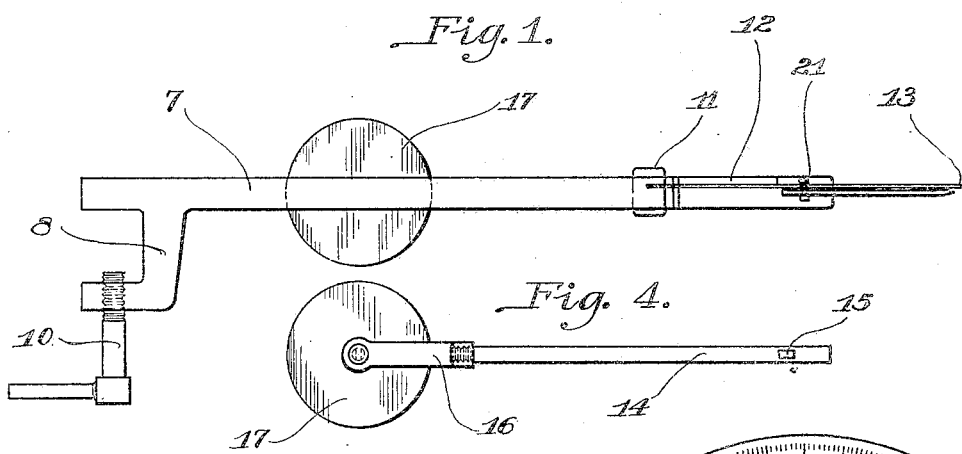
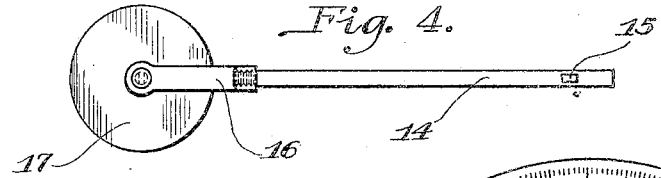
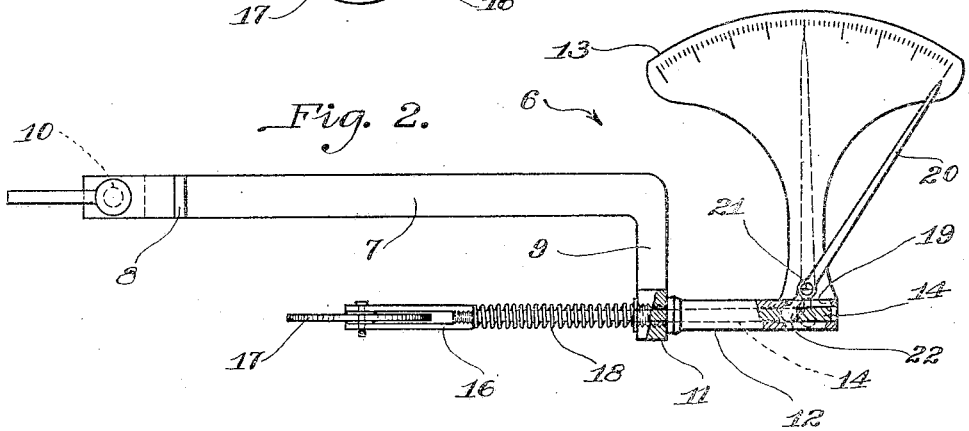
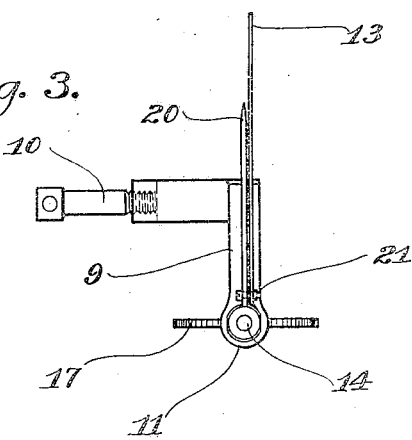
WITNESSES:
INVENTOR.
H. W. Brewer
BY James C. Bradley
ATTORNEY Aug. 26, 1924. 1,506,158
H. W. BREWER
INDICATOR FOR CENTERING TIRES
Filed Dec. 3, 1923 2 Sheets-Sheet 2
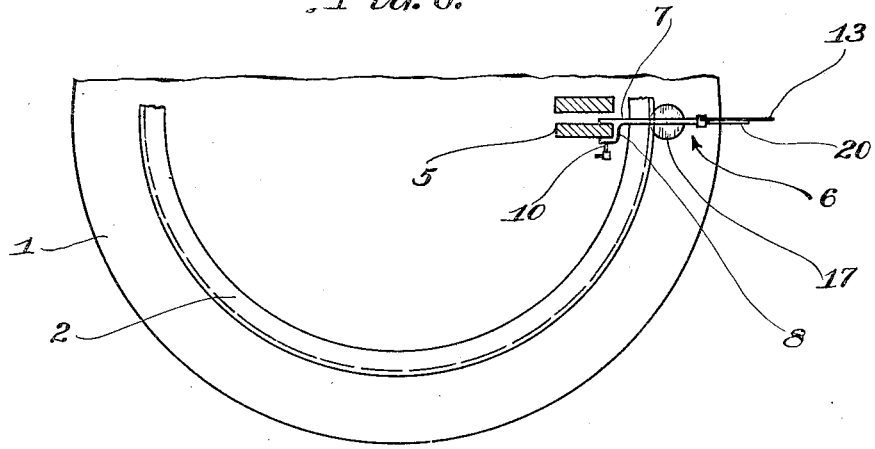
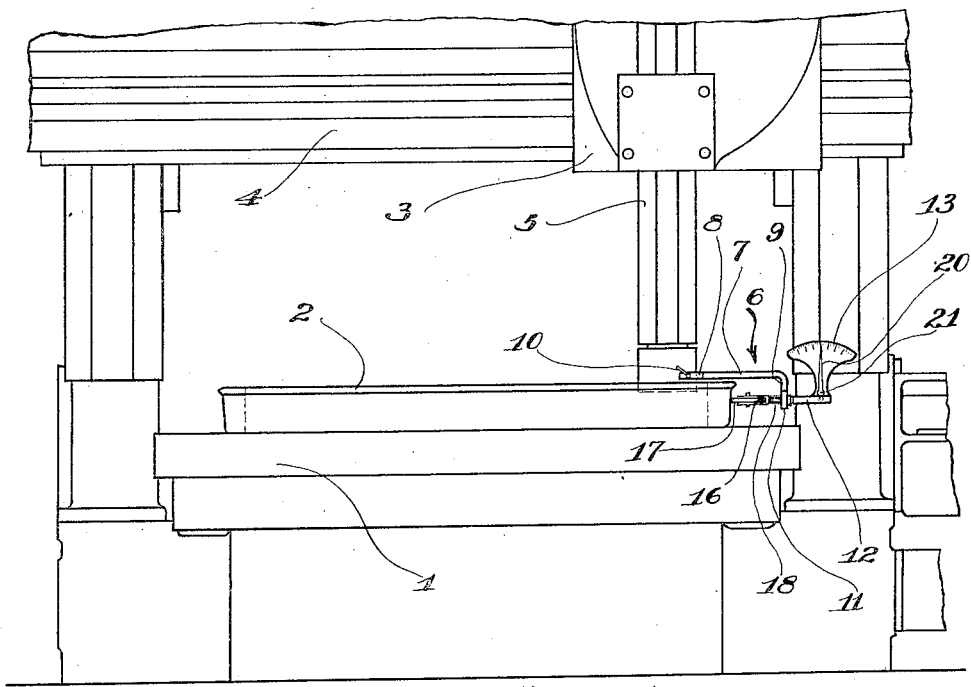
INVENTOR
H. W. Brewer
BY
James C. Bradley
ATTORNEY Patented Aug. 26, 1924.

1,506,158

UNITED STATES PATENT OFFICE.

HUMPHRIES W. BREWER, OF DUBOIS, PENNSYLVANIA.

INDICATOR FOR CENTERING TIRES.

Application filed December 3, 1923. Serial No. 678,172.

*To all whom it may concern:*

Be it known that I, HUMPHRIES W. BREWER, a citizen of the United States, and a resident of Dubois, in the county of Clearfield and State of Pennsylvania, have made a new and useful Invention in Improvements in an Indicator for Centering Tires, of which the following is a specification.

The invention relates to an indicator for centering tires or other members to be turned on vertical boring mills or other turning machines, and similar operations. The invention has for its principal objects the provision of an improved indicator of the type specified, which is of cheap, simple construction; which can be very readily attached to the tool bar of the machine; and which will serve as a guide in accurately positioning the tire on the rotary bed of the machine. One embodiment of the invention is illustrated in the accompanying drawings, wherein:

Figure 1 is a plan view of the indicator. Fig. 2 is a side elevation with certain of the parts partially in section. Fig. 3 is an end elevation. Fig. 4 is a plan view of the spindle and the wheel carried thereby. Fig. 5 is an assembly view showing in side elevation the indicator in position of use, as applied upon a vertical boring mill. And Fig. 6 is a partial plan view of the structure of Fig. 5.

Referring first to the general arrangement as shown in Figs. 5 and 6, 1 is the rotary bed of a boring mill upon which is mounted the tire 2, held temporarily in place by means, not shown, to permit of the ready shifting of the tire to position it as the centering operation progresses. The machine is provided with the ordinary tool carrier or crosshead 3 mounted for movement transversely of the table on the bridge 4, and provided with the usual tool bar 5. The centering device 6 is clamped to the tool bar, and has its wheel in contact with the periphery of the tire.

The indicating device includes a frame 7, provided with the laterally projecting legs 8 and 9, the leg 8 being provided with a clamping screw 10 by means of which the frame is clamped to the tool bar 5, as indicated in Fig. 6.

Screw threaded into the end of the arm 9, as indicated at 11, is the hollow guide member or tube 12, which is preferably a casting integral with the dial 13, although these parts might be separate members secured together. An operating rod 14 is mounted slidably in the member 12, such member having a slot 15 therein at one end, and being screw threaded at its other end into the fork member 16, which carries the wheel 17. A spring 18 surrounding the rod 14 normally presses it to the left (Fig. 2). The tubular member 12 is slotted as indicated at 19, Fig. 2, and through this slot extends the lower end of the pointer 20, such pointer being pivoted to the dial at 21 and having its lower end formed into a ball 22, which engages the slot 15 in the operating bar 14.

In assembling the device, the tubular member 12 is first screwed into the arm 9, after which, the rod 14, with the spring thereon, is inserted in the member 12, so that the slot 15 comes opposite the slot 19, and the pointer is engaged with the slot 15, as indicated in Fig. 2. The pivot 21, upon which the pointer is mounted is then screwed into position.

In using the apparatus, the tire 2 is centered roughly upon the table, and secured in position in a temporary manner, so that it may be readily shifted. The frame 7 is then clamped to the tool bar 5, as indicated in Figs. 5 and 6, and the bar 14 is positioned, so that the wheel 17 engages the periphery of the tire. The cross head 3 is then adjusted along the bridge 4, causing the rod 14 to move through its guide 12, until the pointer 20 is positioned at the center of the dial, as indicated in dotted lines in Fig. 2 and in full lines in Fig. 5. Upon rotating the bed of the mill, the wheel 17 is caused to pass over the periphery of the tire, and any departures, due either to the tire being off center with respect to the center of rotation of the table, or due to the fact that the periphery of the tire does not constitute a true circle, are registered by the pointer upon the dial, and the tire may then be adjusted upon the bed to correct the condition. Such departures are, of course, shown on an enlarged scale upon the dial, thus making them easier to detect and to correct. The device may be very quickly applied to a standard machine and removed therefrom, and greatly facilitates the centering of the tires or other similar work, which requires centering for turning either exteriorly (as shown) or interiorly, the device being readily shifted, if desired, so that the wheel 17 engages the inner surface of the article to be centered instead of the exterior surface.

What I claim is:

1. The combination in a device for use with a turning machine having a rotating bed or table for carrying the work member to be centered and a tool carrier mounted for movement transversely thereof, of a centering device comprising a frame detachably supported from the tool carrier, an operating member mounted for movement on the frame and adapted to engage the annular portion of the work member to be centered, and indicating means carried by the frame and connected to said operating member.

2. The combination in a device for use with a turning machine having a rotating bed or table for carrying the work member to be centered and a tool carrier mounted for movement transversely thereof, of a centering device comprising a frame detachably supported from the tool carrier, an operating member mounted for movement on the frame and adapted to engage the annular portion of the work member to be centered, and a dial carried by the frame and provided with a pointer connected to said operating member.

3. The combination in a device for use with a turning machine having a rotating bed or table for carrying the work member to be centered and a tool carrier mounted for movement transversely thereof, of a centering device comprising a frame detachably supported from the tool carrier, an operating member mounted for movement on the frame and adapted to engage the annular portion of the work member to be centered, a spring for yieldingly holding the operating member in contact with the work member, and indicating means carried by the frame and connected to said operating member.

4. The combination in a device for use with a turning machine having a rotating bed or table for carrying the work member to be centered and a tool carrier mounted for movement transversely thereof, of a centering device comprising a frame detachably supported from the tool carrier, an operating rod mounted for sliding radial movement with respect to the work member and provided with anti-friction means for engaging the periphery of said work member, means whereby said means is yieldingly pressed into engagement with the work member, and indicating means carried by the frame and connected to said operating rod.

5. The combination in a device for use with a turning machine having a rotating bed or table for carrying the work member to be centered and a tool carrier mounted for movement transversely thereof, of a centering device comprising a frame detachably supported from the tool carrier, an operating rod mounted for sliding radial movement with respect to the work member and provided with antifriction means for engaging the periphery of said work member, means whereby said means is yieldingly pressed into engagement with the work member, and a dial carried by the frame and provided with a pointer connected to said rod.

6. The combination in a device for use with a turning machine having a rotating bed or table for carrying the work member to be centered and a tool carrier mounted for movement transversely thereof, and provided with a tool bar, of a centering device comprising a frame bar detachably clamped to said tool bar and extending out past the periphery of said work member, an operating bar slidably supported on the outer end of the frame bar for movement radially of said work member and provided at its inner end with a wheel adapted to engage the periphery of said work member, means whereby said wheel is yieldingly pressed into engagement with the work member, and indicating means carried by the frame bar and connected to said operating bar.

7. A device for centering annular work members upon a turning machine provided with a tool bar, and comprising a frame, means for clamping it to the tool bar of the machine, a tubular guide member carried by the frame and provided with a dial, a pointer pivoted to swing over the dial, an operating rod slidably mounted in the guide member and provided with a wheel for engaging the periphery of the work member to be centered, and a spring tending to move said rod inward, the said rod having a connection at its outer end with said pointer.

8. A device for centering annular work members upon a turning machine provided with a tool bar, and comprising a frame, means for clamping it to the tool bar of the machine, a tubular guide member carried by the frame and provided with a dial, and having a slot through its wall on the side toward the dial, a pointer pivoted to swing over the dial, an operating rod slidably mounted in the guide member and provided with a wheel for engaging the periphery of the work member to be centered, and yielding means tending to move said rod inward, the inner end of said pointer extending through said slot in the guide member and having operative engagement with the outer end of said operating rod.

9. A device for centering annular work members upon a turning machine provided with a tool bar, and comprising a frame, means for clamping it to the tool bar of the machine, a tubular guide member carried by the frame and provided with a dial, and having a slot through its wall on the side toward the dial, a pointer pivoted to swing over the dial, and having its lower end provided with a ball and extending through the slot in the guide member, an operating rod mounted in the guide member and having its outer end slotted to receive said ball on the lower end of the pointer, and provided on its inner end with a wheel for engaging the periphery of the work member to be centered, and yielding means tending to move said rod inward.

In testimony whereof, I have hereunto subscribed my name this 28th day of November, 1923.

H. W. BREWER.